(12) United States Patent
Adharapurapu et al.

(10) Patent No.: US 11,462,344 B2
(45) Date of Patent: Oct. 4, 2022

(54) METHOD OF HEAT-TREATING ADDITIVELY-MANUFACTURED FERROMAGNETIC COMPONENTS

(71) Applicant: General Electric Company, Schenectady, NY (US)

(72) Inventors: Raghavendra Rao Adharapurapu, Bangalore (IN); Sudeep Pradhan Sadananda Rao, Bangalore (IN); Reshma Saira Mathew, Bangalore (IN); Min Zou, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/526,192

(22) Filed: Jul. 30, 2019

(65) Prior Publication Data

US 2021/0035716 A1    Feb. 4, 2021

(51) Int. Cl.
| | | |
|---|---|---|
| *H01F 1/047* | (2006.01) | |
| *B33Y 40/00* | (2020.01) | |
| *B22F 3/24* | (2006.01) | |
| *H01F 41/02* | (2006.01) | |
| *B33Y 40/20* | (2020.01) | |

(Continued)

(52) U.S. Cl.
CPC .............. *H01F 1/047* (2013.01); *B22F 3/24* (2013.01); *B22F 10/50* (2021.01); *B22F 10/64* (2021.01); *B33Y 40/00* (2014.12); *B33Y 40/20* (2020.01); *B33Y 70/00* (2014.12); *H01F 41/0253* (2013.01); *H02K 1/02* (2013.01);

(Continued)

(58) Field of Classification Search
CPC .................................. B22F 3/24; B33Y 40/20
See application file for complete search history.

(56) References Cited

U.S. PATENT DOCUMENTS

| | | |
|---|---|---|
| 4,938,816 A | 7/1990 | Beaman et al. |
| 5,745,834 A | 4/1998 | Bampton et al. |
| (Continued) | | |

FOREIGN PATENT DOCUMENTS

| | | |
|---|---|---|
| CN | 104841938 A | 8/2015 |
| WO | WO2019/199599 A1 | 10/2019 |

OTHER PUBLICATIONS

M. Cossale, A. Krings, J. Soulard, A. Boglietti and A. Cavagnino, "Practical Investigations on Cobalt-Iron Laminations for Electrical Machines," in IEEE Transactions on Industry Applications, vol. 51, No. 4, pp. 2933-2939, Jul.-Aug. 2015, doi: 10.1109/TIA.2015.2394404. (Year: 2015).*

(Continued)

*Primary Examiner* — Sally A Merkling
*Assistant Examiner* — Sean P. O'Keefe
(74) *Attorney, Agent, or Firm* — Dority & Manning, P.A.

(57) ABSTRACT

A method of heat-treating an additively-manufactured ferromagnetic component is presented. The additively-manufactured ferromagnetic component includes a metal alloy having iron and cobalt. The method of heat-treating is performed such that a saturation flux density of a heat-treated ferromagnetic component is greater than a saturation flux density of an as-formed ferromagnetic component. The heat-treated ferromagnetic component has a microstructure (Continued)

having an average grain size of substantially all grains in a range of about 0.1 micron to about 25 microns. A ferromagnetic component is also presented.

20 Claims, 3 Drawing Sheets

(51) Int. Cl.
- *B22F 10/64* (2021.01)
- *B22F 10/50* (2021.01)
- *B33Y 70/00* (2020.01)
- *H02K 1/02* (2006.01)
- *H02K 7/18* (2006.01)

(52) U.S. Cl.
CPC ..... *B22F 2003/248* (2013.01); *B22F 2301/35* (2013.01); *H02K 7/1807* (2013.01)

(56) References Cited

U.S. PATENT DOCUMENTS

| | | | |
|---|---|---|---|
| 2002/0127132 A1* | 9/2002 | Deevi | C22C 1/0433 |
| | | | 420/127 |
| 2014/0154088 A1 | 6/2014 | Etter et al. | |
| 2016/0201155 A1 | 7/2016 | Niendorf et al. | |
| 2017/0155309 A1 | 6/2017 | Jassal et al. | |
| 2017/0209923 A1 | 7/2017 | Giovannetti et al. | |
| 2017/0312857 A1 | 11/2017 | Bourell et al. | |
| 2018/0002795 A1 | 1/2018 | Das | |
| 2019/0115128 A1* | 4/2019 | Cui | H01F 1/059 |
| 2019/0366435 A1* | 12/2019 | Firdosy | B33Y 10/00 |
| 2020/0147688 A1* | 5/2020 | Tenbrink | B22F 10/20 |

OTHER PUBLICATIONS

Kukreja et al., "Emerging Laser Materials Processing Techniques for Future Industrial Applications", Laser-Assisted Fabrication of Materials, vol. 161, pp. 423-478.

Lammers et al., "Additive Manufacturing of a lightweight rotor for a permanent magnet synchronous machine", 2016 6th International Electric Drives Production Conference (EDPC), Conference Location: Nuremberg, Germany, pp. 41-45, Nov. 30-Dec. 1, 2016.

Andreas et al., "Soft Magnetic Material Status and Trends in Electric Machines", IEEE Transaction of industrial electronics, vol. 64 No. 3, Mar. 1, 2017, pp. 2405-2414

European Search Report Corresponding to Application No. 20184900 on Nov. 30, 2020

Kustas et al., "Characterization of the Fe—Co-1.5V soft ferromagnetic alloy processed by Laser Engineered Net Shaping (LENS)", Additive Manufacturing, vol. 21, May 1, 2018, pp. 41-52

Wu Fan et al., "Towards Fully Additively-Manufactured Permanent Magnet Synchronous Machines: Opportunities and Challenge", 2019 IEEE International Electric Machines & Drives Conference (IEMDC), IEEE, May 12, 2019, pp. 2225-2232.

Xiaofang et al., "Improvement of soft magnetic properties of FeCo core alloy by vacuum and fielf annealing", Journal of Beijing Uiversity of Aeronautics and Astronautics, vol. 30 No. 10, China, Oct. 2004, pp. 944-948.

Yang et al., "Effect of remelting on microstructure and magnetic properties of Fe-Co-based alloys produced by laser additive manufacturing", Journal of Physics and Chemistry of Solids, China, 2019, pp. 210-216.

* cited by examiner

METHOD OF HEAT-TREATING ADDITIVELY-MANUFACTURED FERROMAGNETIC COMPONENTS

BACKGROUND

Embodiments of the disclosure generally relate to additively-manufactured ferromagnetic components. More particularly, embodiments of the disclosure relate to a method of heat-treating the additively-manufactured ferromagnetic components.

In electrical machines or devices, ferromagnetic components channel magnetic flux. Typical methods of forming ferromagnetic components of an electrical machine involve multiple steps and multiple parts that are assembled together. Use of multiple steps and multiple parts results in cumbersome and expensive manufacturing processes and may also affect the machine's end performance and reliability. Furthermore, in some topologies, the ferromagnetic components may be structured as insulated laminas compacted together to form a core of the ferromagnetic component. Lamination and insulation may minimize losses such as eddy current losses which may otherwise represent a significant part of energy loss in an electrical machine. However, limitations on the sizes of steel sheets from which laminas are constructed may pose difficulties in assembling multiple laminated components together to form a single component. More complex topologies may decrease losses, increase magnetic flux density, or both, but are difficult to manufacture with conventional methodologies.

Additive manufacturing techniques may be employed to fabricate both laminated and unlaminated ferromagnetic components of an electrical machine. However, additively-manufactured ferromagnetic components may not provide the desired ferromagnetic, mechanical and electrical properties for the end-use application. Thus, there is a need for improved methods of manufacturing additively-manufactured ferromagnetic components for electrical machines.

BRIEF DESCRIPTION

In one aspect, the disclosure relates to a method of heat-treating an additively-manufactured ferromagnetic component composed of a metal alloy including iron and cobalt such that a saturation flux density of a heat-treated ferromagnetic component is greater than a saturation flux density of an as-formed (or as-printed) ferromagnetic component. The heat-treated ferromagnetic component has a microstructure having an average grain size of substantially all grains in a range of about 0.1 micron to about 25 microns.

In another aspect, the disclosure relates to a ferromagnetic component including a heat-treated ferromagnetic component. The heat-treated ferromagnetic component is composed of a metal alloy having iron and cobalt. The heat-treated ferromagnetic component has a microstructure having an average grain size of substantially all grains in a range of about 0.1 micron to 25 microns.

DRAWINGS

These and other features, aspects, and advantages of the present disclosure will become better understood when the following detailed description is read with reference to the accompanying drawings, wherein.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise.

Solidified microstructures obtained using laser-based additive manufacturing techniques are an example of materials science at extraordinary conditions—with over million Kelvin per second solidification rates, ultra-fine microstructures, and far-from-equilibrium meta-stable phase formation. Therefore, the microstructures obtained, using typical additive manufacturing techniques, in ferromagnetic materials, especially, grain size, phase stability and grain texture, are not tailored for direct electromagnetic (EM) applications, due to high hysteresis losses. A heat-treatment procedure may improve the magnetic properties of additively-manufactured ferromagnetic components to substantially match the magnetic properties of commercially-produced wrought components. These magnetic properties are attained despite a marked difference in microstructure between the additively-manufactured and wrought components. However, the heat-treatment causes increased grain size, which attributes to the reduction in desired mechanical properties.

Embodiments of the present disclosure provide a method of heat-treating an additively-manufactured ferromagnetic component to advantageously attain desirable electromagnetic and mechanical properties. In some embodiments, a method of heat-treating an additively-manufactured ferromagnetic component is presented such that a saturation flux density of a heat-treated ferromagnetic component is greater than a saturation flux density of an as-formed (or as-printed) ferromagnetic component. The heat-treated ferromagnetic component has a microstructure having an average grain size of substantially all grains in a range of about 0.1 micron to about 25 microns.

The term "additively-manufactured ferromagnetic component" as used herein refers to a final component formed by an additive manufacturing process as well as to the intermediate layers or sub-components formed during the additive manufacturing process. For the sake of brevity, the terms "additively-manufactured ferromagnetic component" and "ferromagnetic component" are used herein interchangeably.

In some embodiments, the method in accordance with embodiments of the disclosure further includes providing an additively-manufactured ferromagnetic component, before the heat-treatment step. The term "providing" as used herein includes embodiments wherein the additively-manufactured ferromagnetic component is procured from a suitable source, as well as embodiments wherein the additively-manufactured ferromagnetic component is manufactured using an additive manufacturing technique for example as described in FIG. 1, before the heat-treatment step. In some embodiments, the additively-manufactured ferromagnetic component is provided for Hot Isostatic Processing (HIP) before or after the heat-treatment step.

An additively-manufactured ferromagnetic component, in accordance with the embodiments described herein, is manufactured using an additive manufacturing technique. "Additive manufacturing" is a term used herein to describe a process which involves layer-by-layer construction or additive fabrication (as opposed to material removal as with conventional machining processes). Such processes may also be referred to as "rapid manufacturing processes". The additive manufacturing process forms net or near-net shape structures through sequentially and repeatedly depositing and joining material layers. As used herein the term "near-net shape" means that the additively-manufactured structure is formed very close to the final shape of the structure, not requiring significant traditional mechanical finishing techniques, such as machining or grinding following the additive manufacturing process.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

The additive manufacturing processes in accordance with embodiments of the disclosure may be used on suitable metal alloys for example soft ferromagnetic metal alloys, to form the ferromagnetic components of the electrical machine. As used herein, the term "soft ferromagnetic metal alloy" refers to materials that are easily magnetized and demagnetized. For example, soft ferromagnetic metal alloys typically have low intrinsic coercivity less than 1000 $Am^{-1}$ and are used primarily to enhance and/or channel the flux produced by an electric current.

In some embodiments, the ferromagnetic component is composed of a soft ferromagnetic metal alloy such as a metal alloy including iron and cobalt. The amounts of iron and cobalt, independently, may vary in a range of about 30 atomic percent to 70 atomic percent. In some embodiments, an atomic ratio of the amounts of iron and cobalt is 1:1.

In some embodiments, the metal alloy further includes a first alloying element present in the range of about 0.001 atomic percent to about 10 atomic percent selected from the group consisting of boron, aluminum, silicon, germanium, yttrium, titanium, zirconium, hafnium, vanadium, niobium, tantalum, chromium, molybdenum, tungsten, manganese, rhenium, ruthenium, rhodium, iridium, nickel, palladium, platinum, copper, silver, gold, and combinations thereof, and a second alloying element present in the range of about 0.001 atomic percent to about 0.5 atomic percent selected from the group consisting of carbon, oxygen, nitrogen, and combinations thereof. In some embodiments, the first alloying element may be present in a range of about 0.01 atomic percent to about 7 atomic percent. In certain embodiments, the first alloying element may be present in a range of about 0.1 atomic percent to about 5 atomic percent. In certain embodiments, the metal alloy includes vanadium, niobium, carbon and a combination thereof. Vanadium and niobium, individually, may be present in a range of about 0.1 atomic percent to about 10 atomic percent. In some embodiments, vanadium and niobium, individually, may be present in a range of about 0.1 atomic percent to about 5 atomic percent. These materials may be used in these methods and systems in a variety of forms, as appropriate, for a given material and method, including, for example and without limitation, granules, powders, sheets, foils, tapes, filaments, flakes, pellets, wires, plates, blocks, ingots, and combinations of these forms. In some embodiments, the metal alloy includes iron, cobalt, vanadium, and carbon. In some other embodiments, the metal alloy includes iron, cobalt, vanadium and niobium. In some other embodiments, the metal alloy includes iron, cobalt, vanadium, niobium and carbon.

In some embodiments, the additively-manufactured ferromagnetic component has a unitary structure. The term "unitary structure" as used herein refers to a structure wherein all of the structural features of such structure are integral with each other. As used herein, the term "integral" means that the different geometric and structural features that define the unitary structure are formed together as features of a single, continuous, undivided structure, as opposed to previously formed or otherwise manufactured components that are assembled together or otherwise joined or affixed together using one or more of various joining means to yield a final assembled product. Thus, the different structural or geometric features of the unitary structure are not attached to or affixed to each other, e.g., bolted to, welded to, brazed to, bonded to, or the like. A unitary structure in accordance with the embodiments described herein may be formed using an additive manufacturing technique.

In some other embodiments, two or more parts of a component may be manufactured by additive manufacturing. In these instances, the additively-manufactured parts may be joined by using a suitable joining technique such as laser welding, inertia welding or the like.

Figure 1:
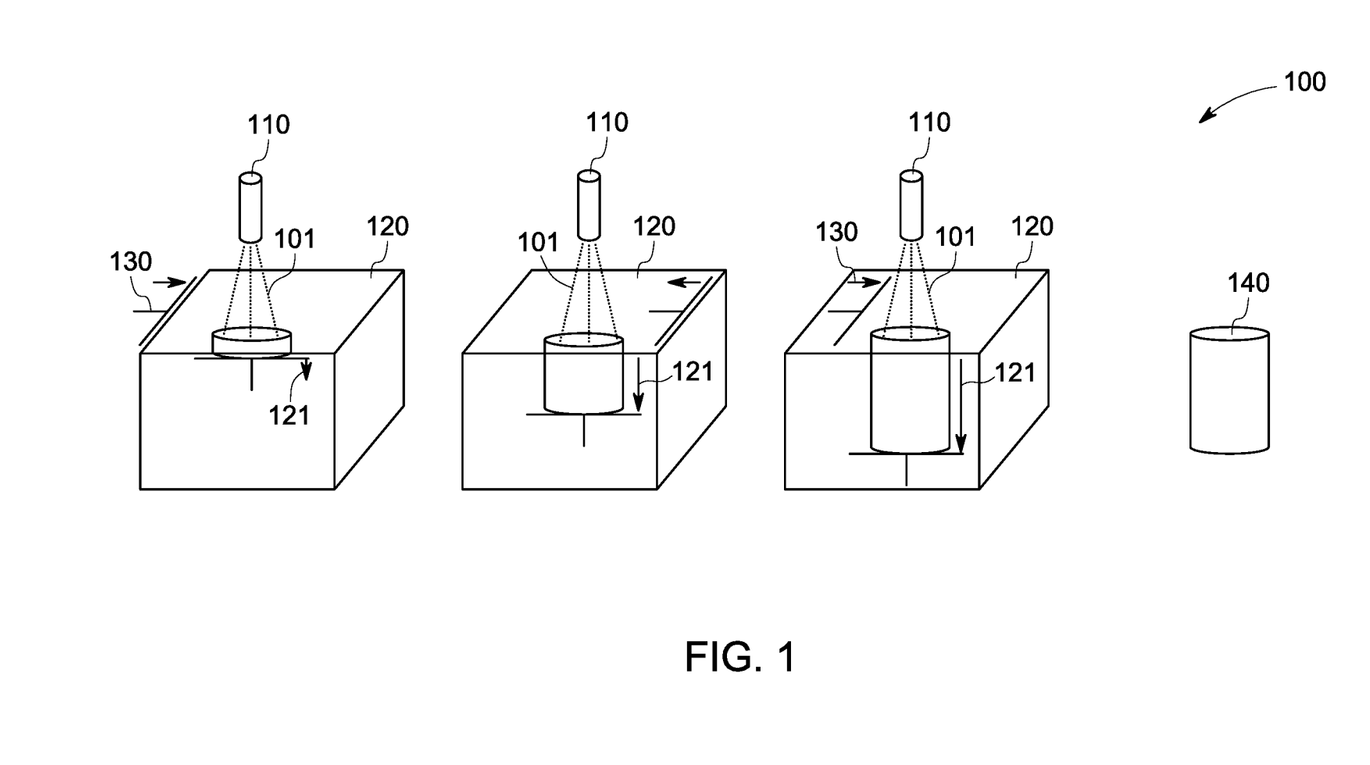
FIG. 1 illustrates a schematic drawing of an additive manufacturing system for manufacturing an additively-manufactured ferromagnetic component, in accordance with some embodiments of the disclosure.

FIG. 1 illustrates a schematic drawing of an additive manufacturing system 100 used for manufacturing a ferromagnetic component, in accordance with embodiments of the disclosure. Only some components of an additive manufacturing system 100 are shown in FIG. 1 for purposes of simplicity but it would be understood that other components may also be included. In FIG. 1, an energy source 110 directs an energy beam 101 towards portions of a surface of a bed 120 of a ferromagnetic material. Non-limiting examples of suitable energy beam include laser, electron beam, or a combination thereof. The energy beam 101 fuses a portion of the ferromagnetic material together, whereupon the bed 120 of the ferromagnetic material is lowered in the direction 121 and a fresh layer of ferromagnetic material is deposited thereupon by a suitable applicator 130 (e.g., a roller, a coater, or a swiping blade). This is typically referred to as one 'build step" of an additive manufacturing process. The terms "fuse" or "fusing" as used herein refer to agglomeration, melting, sintering a portion of the ferromagnetic material to each other, as well as to a portion or portions of underlying ferromagnetic material (if present). By applying successive steps of fusing and depositing, a three-dimensional component 140 is manufactured.

Figure 2:
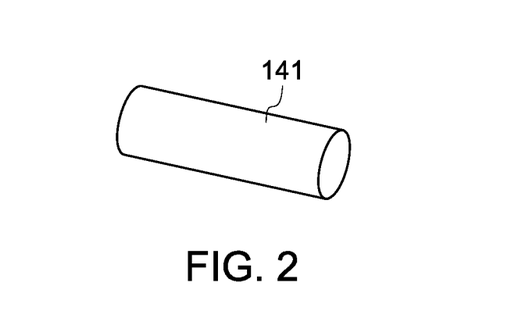
FIG. 2 shows a solid cylindrical ferromagnetic component manufactured using an additive manufacturing technique, in accordance with some embodiments of the disclosure.
Figure 3:
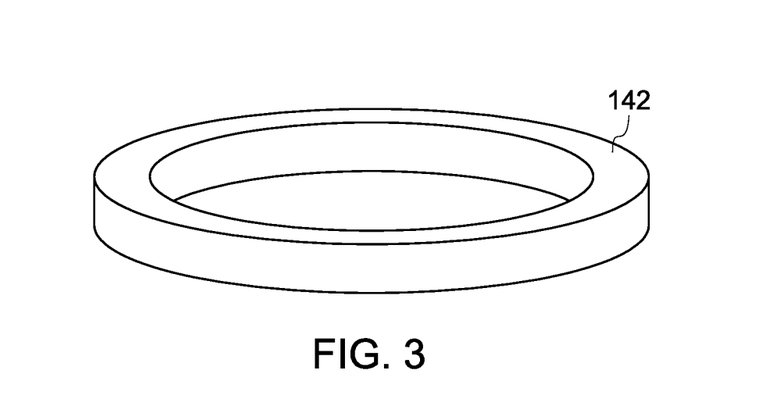
FIG. 3 shows a solid ring ferromagnetic component manufactured using an additive manufacturing technique, in accordance with some embodiments of the disclosure.
Figure 4:
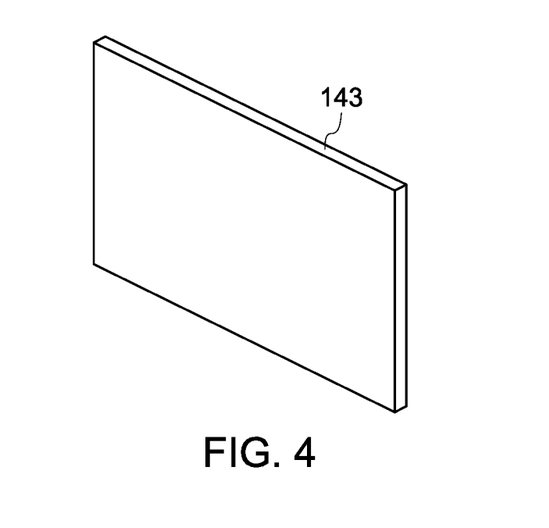
FIG. 4 shows a flat ferromagnetic component manufactured using an additive manufacturing technique, in accordance with some embodiments of the disclosure.

In this example, the three-dimensional component 140 is illustrated as cylindrical in shape, however, any other three-dimensional topology suitable as a ferromagnetic component is also encompassed within the scope of the disclosure. Non-limiting examples of other three-dimensional topologies of the ferromagnetic components envisaged within the scope of the disclosure includes sheets, rings, cubes, cuboids, helical, spirals, and the like. Further, the methods as described herein may be suitable for laminated as well as non-laminated ferromagnetic components. FIG. 2 shows a solid cylindrical ferromagnetic component 141, manufactured using an additive manufacturing technique, in accordance with some embodiments of the disclosure. FIG. 3 shows a solid ring ferromagnetic component 142 manufactured using an additive manufacturing technique, in accordance with some embodiments of the disclosure. FIG. 4 shows a flat ferromagnetic component 143 such as a sheet manufactured using an additive manufacturing technique, in accordance with some embodiments of the disclosure.

Furthermore, the term "as-formed ferromagnetic component" or "as-printed ferromagnetic component" refers to an additively-manufactured ferromagnetic component that has not been subjected to an additional heat-treatment step besides the fusing steps employed during the additive manufacturing technique, as described hereinabove. Therefore, while referring to FIG. 1, the component 140 may be referred to an "as-formed ferromagnetic component" or "as-printed ferromagnetic component" if it has not been subjected to an additional heat-treatment step either during, or, after the additive manufacturing process used to form the component. The term "heat-treated ferromagnetic component" refers to an additively-manufactured ferromagnetic component that has been subjected to at least one additional heat treatment step during, or, after the completion of the additive manufacturing process. The component 140, after being subjected to one or more additional heat-treatment steps (during, or, after the additive manufacturing process) may be referred to as a "heat-treated ferromagnetic component."

In accordance with embodiments of the disclosure, "heat-treating" or "heat-treatment step" refers to holding the ferromagnetic component at a temperature less than the ferrite-to-austenite transition temperature, for at least 10 min. The heat-treatment may be implemented as isothermal heat treatment, i.e., the ferromagnetic component is subjected to a substantially constant temperature for a certain period of time, or, alternatively, as a cyclic heat treatment wherein the ferromagnetic component is subjected a temperature for a duration of time, cooled, and then heated again. In some embodiments, the ferromagnetic component is heat treated at a temperature in a range of about 600° C. to about 1000° C. In certain embodiments, the ferromagnetic component is heat treated at a temperature in a range of about 650° C. to about 900° C. In certain embodiments, the heat-treatment is implemented as an isothermal heat treatment between about 700° C. and about 850° C. Further, the heat-treatment is implemented for a time duration in a range of about 1 hour to about 10 hours. Further, the heat-treatment is implemented in vacuum of 1 micron ($1.33 \times 10^{-3}$ mbar), or partial pressure of high-purity Argon, or 100% dry-Hydrogen atmosphere, with entry dew point dryer than −60° F. (−51° C.) and the exit dew point dryer than about −40° F. (−40° C.) when the inside temperature is above 900° F. (482° C.).

As noted earlier, inventors of the present application have surprisingly found that the average grain-size of the grains in the additively manufacture ferromagnetic component does not increase much during the heat-treatment of the ferromagnetic component at elevated temperatures. In other words, the grain growth is not significant, and the average grain-size is controlled to be less than 25 microns. This distribution in grain sizes is unlike the typical grain distribution seen in commercially-available heat-treated wrought ferromagnetic components. Despite the differences in microstructure of the heat-treated ferromagnetic components of the present disclosure and the commercially available wrought components, the heat-treated ferromagnetic components unexpectedly showed improved mechanical and ferromagnetic properties compared to those of the commercially available wrought components.

In some embodiments, the as-formed ferromagnetic component has an average grain size less than or equal to 10 microns and the heat-treated ferromagnetic component has a microstructure having an average grain size of substantially all grains less than or equal to 25 microns. In some embodiments, the as-formed ferromagnetic component has an average grain size less than or equal to 5 microns and the heat-treated ferromagnetic component has a microstructure having an average grain size of substantially all grains less than or equal to 10 microns.

As used herein, the term "substantially all grains" refers to more than 90 percent grains of the total grains of a microstructure of a ferromagnetic component. In some embodiments, the term "substantially all grains" refers to more than 95 percent grains of the heat-treated ferromagnetic component. In some embodiments, the microstructure of the heat-treated ferromagnetic component has an average grain size of more than 90 percent grains in a range of about 0.1 micron to about 25 microns. In some embodiments, the average grain size of substantially all grains is in a range of about 0.5 micron to about 20 microns. In some embodiments, the average grain size of substantially all grains is in a range of about 1 micron to about 20 microns.

The heat-treated ferromagnetic component may be further characterized by its porosity. In some embodiments, the microstructure of the heat-treated ferromagnetic component has a porosity less than 0.5 percent. For example, the porosity is in a range of about 0.001 percent to about 0.5 percent. In certain embodiments, the microstructure has a porosity in a range of about 0.005 percent to about 0.1 percent.

As noted earlier, the room-temperature yield strength (0.2% yield strength) of the heat-treated ferromagnetic component is greater than 100 kilopound per square inch (ksi), which is greater than a yield strength (typically, <90 ksi) of a heat-treated component manufactured using conventional machining/processing, such as cold-rolling. In some embodiments, the yield strength of the heat-treated ferromagnetic component may be in a range of about 100 ksi to about 165 ksi. In some embodiments, the yield strength of the heat-treated ferromagnetic component is greater than 120 ksi. In certain embodiments, the room-temperature yield strength of the heat-treated ferromagnetic component is in a range of about 125 ksi to about 150 ksi.

The saturation flux density of the heat-treated ferromagnetic component is equal to or greater than a saturation flux density of an as-formed ferromagnetic component. A saturation flux density of an as-formed ferromagnetic component may be, for example, equal to or less than 2 Tesla, and the saturation flux density of the heat-treated ferromagnetic component may be greater than 2 Tesla. In some embodiments, the saturation flux density of the heat-treated ferromagnetic component is greater than 2.2 Tesla. In some embodiments, the saturation flux density of the heat-treated ferromagnetic component is in a range of about 1.6 Tesla to about 2.5 Tesla. In some embodiments, the saturation flux density of the heat-treated ferromagnetic component is in a range of about 2.2 Tesla to about 2.4 Tesla. Heat-treatment of the additively-manufactured ferromagnetic component, in accordance with embodiments of the disclosure, further exhibited increase in saturated relative permeability. In some embodiments, the coercivity of the heat-treated ferromagnetic component is in the range of about 0.1 Oersted to about 40 Oersted. In certain embodiments, the coercivity of the heat-treated ferromagnetic component is in the range of about 0.5 Oersted to about 20 Oersted.

Moreover, the electrical resistivity of the heat-treated ferromagnetic component may be greater than $10\mu\Omega\cdot cm$. In some embodiments, the heat-treated ferromagnetic component has an electrical resistivity in a range of about $20\mu\Omega\cdot cm$ to about $150\mu\Omega\cdot cm$.

The heat-treatment may be implemented during and/or after the additive manufacturing process and/or during and/or after HIP processing. In some embodiments, the heat treatment is performed after the additive manufacturing process. In some embodiments, the heat treatment is performed during or after performing the HIP process. Thus, in such embodiments, while referring to FIG. 1, the additively-manufactured ferromagnetic component 140 is further subjected to one or more heat-treatment steps, as described earlier, to form a heat-treated ferromagnetic component.

In some other embodiments, the heat treatment is performed during at least one build step of an additive manufacturing process used to form the additively-manufactured ferromagnetic component. In some such embodiments, with reference to FIG. 1, the heat treatment may be performed using the same directed energy source 110 used during the build step of the additive manufacturing process. This may be applicable to any additive modality that uses directed energy, including laser melting/sintering and electron beam melting. Further, in such instances, the heat-treatment may be performed using for example a beam splitting technique and/or by modulating the power of the directed energy source, during a particular build step. For example, during a build step, after the ferromagnetic material has fused with itself and with underlying layers (if present), the power of the energy source (e.g., laser) may be modulated such that the build layer is heat treated at a desired temperature for a time duration. In some such embodiments, the heat treatment may be performed, after each build step, such that subsequent build layers of the ferromagnetic component 140 are heat treated individually. In some other embodiments, the heat treatment may be performed after the last build layer is formed and during the final build step for manufacturing the ferromagnetic component 140.

The methods of heat treating, in accordance with embodiments of the disclosure, cover uniform heat treatment for an entire additively-manufactured ferromagnetic component, as well as non-uniform heat treatment. In some embodiments, different portions of the ferromagnetic component may be selectively heat treated to achieve determined saturation flux density and tensile strength values in these portions. The selective heat treatment of a ferromagnetic component may be implemented during, or, after the additive manufacturing process. By way of example, in instances where stator laminations integrated with housing/cooling jackets are additively manufactured, only the flux carrying components may be selectively heat treated. Similarly, in instances where a rotor core is additively manufactured with an integrated shaft, only the flux carrying components (i.e., the ferromagnetic components) may be selectively heat treated.

Thus, in accordance with some embodiments of the disclosure, the processes as described herein may enable a component to achieve improved mechanical properties by controlling the average grain size to be less than 25 microns and heat treating an additively-manufactured ferromagnetic component while attaining desirable magnetic and electrical properties. Use of such additively-manufactured ferromagnetic components (having good magnetic and mechanical properties) provide an additive-enabled part count reduction and more cost-effective components for use in electric machines such as hybrid electric propulsion.

The method may further include the step of incorporating the heat-treated ferromagnetic component into an electrical machine. Non-limiting examples of suitable electrical machines include a motor, a generator, a transformer, a toroid, an inductor, and combinations thereof. In certain embodiments, an electric machine refers to an electric motor that converts electric power to mechanical power or to an electric generator that converts mechanical power to electric power. The electrical machine in accordance with embodiments of the disclosure may have any suitable topology, for example, a radial, an axial, or a transverse flux topology.

Figure 5:
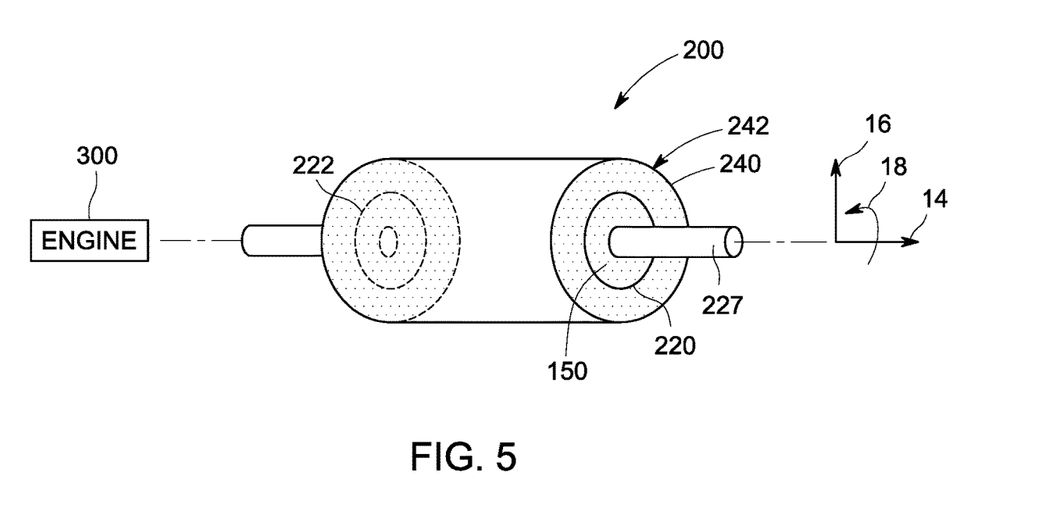
FIG. 5 illustrates a perspective view of an engine coupled to a generator that includes a ferromagnetic component, in accordance with some embodiments of the disclosure.

Some embodiments are directed to an electrical machine, for example an electric generator including the ferromagnetic component. FIG. 5 depicts an example of an electric generator 200 including a heat-treated ferromagnetic component 150, in accordance with embodiments of the disclosure. As illustrated, the electric generator 200 is coupled to an engine 300 (e.g., an engine of an automobile or an aircraft). While the illustrated electric machine is an electric generator, it may be appreciated that the methods discussed herein are applicable to other electric machines, such as electric motors. In the illustrated embodiment, the electric generator 200 may be described relative to an axial direction 14, a radial direction 16, and a circumferential direction or an annular direction 18. The electric generator 200 includes a rotor assembly 220 and a stator assembly 240. The rotor assembly 220 is configured to rotate in the circumferential direction 10 relative to the stator assembly 240. The rotational energy (e.g., the relative rotation between the rotor assembly 220 and the stator assembly 240) is converted to electrical current in armature or power generation coil within the stator or rotor assembly, depending on the design of the electric generator 200.

The rotor assembly 220 includes a rotor core 222 and is mounted on a shaft 227 such that the rotor core 222 rotates together with the shaft 227. The stator assembly 240 also includes a stator core 242. Further, the rotor assembly 220 and the stator assembly 240 generally both include coil windings. In certain embodiments, the rotor assembly 220 includes field windings that generate a magnetic field, and the stator assembly 240 includes armature or power generation windings that generate electrical power as the rotor assembly 220 rotates. In other embodiments, the stator assembly 240 may include field windings, and rotor assembly 220 may include the armature or power generation windings. Referring to FIG. 5, the rotor assembly 220, the stator assembly 240, or both may include a ferromagnetic component for example, a heat-treated ferromagnetic component as described above. In some embodiments, the rotor core 222 includes a ferromagnetic component, as described herein. In some embodiments, the electric generator 200 includes a ferromagnetic component other than the stator assembly 240 and the rotor assembly 220.

The ferromagnetic component is composed of a soft ferromagnetic metal alloy, as described previously. In some embodiments, the ferromagnetic component is manufactured by an additive manufacturing process (as described previously) followed by a heat treatment process. That is, the ferromagnetic component may be a heat treated ferromagnetic component. The ferromagnetic component includes a microstructure having an average grain size of substantially all grains less than 25 microns. The average grain size of substantially all grains is in a range of about 0.1 micron to about 25 microns. The ferromagnetic component has a unitary structure and a saturation flux density greater than 2 Tesla.

Additive manufacturing of ferromagnetic components of electrical machines can enable circumventing complex assemblies of electrical components by building complex near-net-shape geometries, such as manufacturing of radial, axial and transverse flux laminated ferromagnetic parts. Additional benefits include thermal management via incorporating intricate cooling channels, weight reduction due to the ability to manufacture intricate details that are not possible with conventional machining/subtractive processes. Additive manufacturing might also allow reducing the number of parts in an electric machine by eliminating connection components (such as bolts, rivets, brackets etc.) and/or eliminating joining processes (such as brazing, soldering, gluing etc.). Further, additive manufacturing of electric machine components may enable dramatic reductions in cycle time for development; and, manufacturing costs may be reduced by avoiding the need for expensive tooling and iterative modification of the tooling. However, as mentioned earlier, the microstructure, especially, grain size, phase stability and grain texture, of additively-manufactured ferromagnetic components is not tailored for direct electromagnetic (EM) applications due to high hysteresis losses.

By employing heat-treatment procedures on additively-manufactured ferromagnetic components, in accordance with embodiments of the disclosure, the required combination of ferromagnetic properties such as, higher saturation flux density and high mechanical properties such as high yield strength may be attained.

Further, locally heat treating the ferromagnetic material during the additive manufacturing process offers the machine designer the flexibility to effectively tailor the material performance to meet both magnetic and mechanical performance requirements. For example, regions of the ferromagnetic component subjected to high mechanical stress, but low magnetic flux change, could be locally heat treated to have high tensile strength. Regions that are mechanically static but have high frequency flux change could thus be heat treated to have low losses. The capability provided by some of the embodiments of the disclosure may therefore open the design space to include machine topologies with both high-power density and high efficiency. The benefits may accrue to the balance of systems in the product, such as simpler thermal management systems and lighter structural support members.

EXAMPLES

Thus, inventors of the present application have unexpectedly found a heat-treatment procedure that results in improvement in ferromagnetic properties despite the formation of an irregular microstructure.

The powder material for the additive manufacturing process was supplied by Carpenter Technology Corp. (Pennsylvania, USA). The chemistry of the alloy was (balance) Fe-49Co-2V-0.3Nb (weight % actual) with other minor elements of 0.015 weight % Carbon, 0.03 weight % Silicon, 0.18 weight % Nickel, and the powder size was $-55\ \mu m + 15\ \mu m$ (95%). The powder was used to build small components such as cylinders, rings, sheets and plates using laser-based additive manufacturing technique. All samples were manufactured on EOS (Electro Optical System) or (CL) Concept Laser machines at GE India Industrial Pvt. Ltd., Bangalore, India. The solid cylinder samples were used for cross-sectional porosity measurement tests and grain size measurements. The flat sheet samples were used for tensile mechanical strength testing as per ASTM E-8 standard, magnetic measurements of magnetic saturation and coercivity as per the VSM (vibrating-sample magnetometer) and electrical resistivity measurements as per four-point probe.

A commercially available FeCo-based alloy's cold-rolled sheet (Hiperco50HS with composition Fe-49Co-2V-0.3Nb, commercially available from Carpenter Technology Corp, Pennsylvania, USA) was used as a comparative example. The cold-rolled sheet was heat treated at about 720° C. for 4 hours in 100% dry-Hydrogen atmosphere. This sample was used as a Comparative Example 1. Additively-manufactured solid cylinder sample and additively-manufactured sheet sample that were not subjected to any heat-treatment, were used as Comparative Example 2. Additively-manufactured samples (solid cylinders and sheets) that were subjected to furnace heat-treatment were used as Comparative Examples 3-6 (Table 1).

Samples measuring 0.5-inch diameter×0.25-inch height were cut from the additively-manufactured solid cylinder samples for heat treatment. Samples (as per ASTM E-8 standard) measuring 100 mm long with 25 mm gage length and 6 mm width were also prepared for tensile test measurement. Samples of size 5 mm×2.5 mm×0.4 mm were cut perpendicular to the additive printing vertical-direction from sheet samples for characterization of magnetic properties. Samples measuring 25.4 mm diameter×2 mm thickness were used for electrical resistivity measurements. All the samples were heat-treated in a furnace with heating elements in argon-2.9% hydrogen forming gas except for 775° C.-4 hours where 100% dry-Hydrogen atmosphere (dew point of at least-50° C.) was used. The additively-manufactured samples were heat-treated between 700° C. and 1000° C. for 1-4 hours. Table 1 provides the component characteristics and heat treatment conditions for different samples described herein.

TABLE 1

Component characteristics and heat treatment conditions for different Examples

| Example | Component Characteristics | Heat treated | Heat treatment conditions |
|---|---|---|---|
| Comparative Example 1 | Commercially available Hiperco50HS Fe—49Co—2V—0.3Nb alloy cold-rolled into a sheet | Yes | Isothermal heat treatment at 720° C. for 4 hours |
| Comparative Example 2 | Additively-manufactured FeCo—2V—0.3Nb | No | — |
| Comparative Example 3 | Additively-manufactured FeCo—2V—0.3Nb | Yes | Isothermal heat treatment at 720° C. for 4 hours |
| Comparative Example 4 | Additively-manufactured FeCo—2V—0.3Nb | Yes | Isothermal heat treatment at 750° C. for 4 hours |
| Comparative Example 5 | Additively-manufactured FeCo—2V—0.3Nb | Yes | Isothermal heat treatment at 775° C. for 4 hours |
| Comparative Example 6 | Additively-manufactured FeCo—2V—0.3Nb | Yes | Isothermal heat treatment at 780° C. for 4 hours |

After additive-manufacturing and heat-treatment (as applicable according to Table 1), the samples were sectioned and metallographically polished for microstructure characterization. Microstructure characterization was conducted using scanning electron microscopy (SEM) and electron backscatter detector analysis (EBED) to analyze microstructure and measure grain size.

Table 2 shows the grain size of the commercially available heat-treated cold rolled sheet of Comparative Example 1, the as-formed additively-manufactured samples of Comparative Example 2, and additively-manufactured and heat-treated samples of Examples 3-7. SEM micrographs for the heat-treated cold rolled sheet (Comparative Example 1) showed a uniform grain structure with median grain size less than 25 microns. SEM micrographs of as-formed additively-manufactured cylindrical samples (Comparative Example 2) showed small grain size where the median grain size was less than 10 microns. SEM micrographs of heat-treated samples of Comparative Examples 3-6 (after heat-treating the additively-manufactured samples) between 700° C.-800° C. for 1-4 hours showed no significant increase in the grain size. The median grain sizes of the samples of Comparative Examples 3-6 were less than 20 microns.

TABLE 2

Grain Size Measurements for different Examples

| Temperature (° C.) | Grain size (micron) |
|---|---|
| Comparative Example 1 | >25 |
| Comparative Example 2 | 1.33 ± 1 |
| Comparative Example 3 | 1.40 ± 1.02 |
| Comparative Example 4 | 1.52 ± 0.87 |
| Comparative Example 5 | 1.58 ± 0.90 |

Post additive-manufacturing and post-heat-treatment (as applicable according to Table 1), the samples were prepared and tested for mechanical yield strength properties. Table 3 shows the yield strengths of the commercially available heat-treated cold rolled sheet of Comparative Example 1, the as-formed additively-manufactured samples of Comparative Example 2, and additively-manufactured and heat-treated samples of Comparative Examples 3-6.

TABLE 3

Yield Strength Measurements for different Examples

| Example | 0.2% Yield Strength (ksi) |
|---|---|
| Comparative Example 1: Commercial | 87 |
| Comparative Example 2: As-formed | 165.4 ± 10.6 |
| Comparative Example 3: 720° C. - 4 hours | 142.7 ± 5.6 |
| Comparative Example 4: 750° C. - 4 hours | 133.3 ± 5.3 |
| Comparative Example 5: 775° C. - 4 hours | 136.2 ± 5.4 |
| Comparative Example 6: 780° C. - 4 hours | 126.9 ± 5.3 |

As shown in Table 3, the as-formed additive manufactured sample (Comparative Example 2) exhibited the highest strength 165 ksi. For heat-treatment above 700° C., the yield strength reduced by 10-15% initially (for Comparative Example 3) and then gradually decreased or remained constant for heat-treating at higher temperatures (Comparative Examples 4, 5, and 6).

Post-additive manufacturing and post-heat-treatment, the samples were prepared and tested for magnetic and electrical resistivity properties.

TABLE 4

Saturation Magnetization and Coercivity Measurements for different Examples

| Example | Saturation Magnetization, Ms Tesla (T) 4 hours | Coercivity, Hc Oersted 4 hours | Electrical resistivity, Micro Ohms-cm |
|---|---|---|---|
| Comparative Example 1 | 2.28 | 6 | 45 |
| Comparative Example 2: As-formed | 2.23 | 32.6 | |
| Comparative Example 3: 720° C.-4 hours | 2.30 | 15.2 | |
| Comparative Example 4: 750° C.- 4 hours | 2.28 | 13 | |
| Comparative Example 5: 775° C.- 4 hours | 2.29 | 14 | 90 ± 5 |
| Comparative Example 6: 780° C. - 4 hours | 2.29 | 7.6 | |

As shown in Table 4, the saturation flux density of the additively-manufactured cylindrical sample increased from 2.23 Tesla (Comparative Example 2) to ~2.3 Tesla (Comparative Examples 3-6), after the heat treatment for 4 hours. This value is similar to the commercially available Hiperco50HS cold-rolled sheet sample (Comparative sample 1). As shown in Table 4, the Coercivity values decreased from the values of ~32.6 Oe for Comparative Example 2 to below 20 Oe for Comparative Examples 3-5 and even below 10 Oe for Comparative Example 6. As shown in Table 4, the electrical resistivity for Comparative Example 5 is 90 micro Ohm-cm, nearly twice the value of the commercial Comparative Example 1. Accordingly, Comparative Example 5 exhibited low coercivity and high resistivity which are beneficial for low core-losses.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method, comprising:
   heat-treating an as-formed additively-manufactured ferromagnetic component to form a heat-treated ferromagnetic component having a saturation flux density that is greater than a saturation flux density of the as-formed additively-manufactured ferromagnetic component, wherein the heat-treated ferromagnetic component is composed of a metal alloy, and the heat-treated ferromagnetic component has a microstructure having an average grain size of more than 90% of all grains in a range of 0.1 microns to 25 microns, and wherein the metal alloy includes iron, cobalt, and niobium with niobium present in a range of 0.1 atomic percent to 10 atomic percent; and
   heat-treating the additively-manufactured ferromagnetic component during at least one build step in a powder bed additive manufacturing process used to form the additively-manufactured ferromagnetic component.

2. The method of claim 1, wherein the metal alloy further includes vanadium.

3. The method of claim 2, wherein vanadium is present in a range of 0.1 atomic percent to 10 atomic percent.

4. The method of claim 2, wherein the metal alloy further includes a first alloying element present in a range of 0.001 atomic percent to 10 atomic percent selected from the group consisting of boron, aluminum, silicon, germanium, yttrium, titanium, zirconium, hafnium, tantalum, chromium, molybdenum, tungsten, manganese, rhenium, ruthenium, rhodium, iridium, nickel, palladium, platinum, copper, silver, gold, and combinations thereof, and a second alloying element present in the range of 0.001 atomic percent to 0.5 atomic percent selected from the group consisting of carbon, oxygen, nitrogen and combinations thereof.

5. The method of claim 1, wherein the as-formed ferromagnetic component has an average grain size less than or equal to 10 microns.

6. The method of claim 5, wherein the heat-treated ferromagnetic component has an average grain size of more than 90% of all grains in a range from 1 micron to 10 microns.

7. The method of claim 1, wherein the additively-manufactured ferromagnetic component is heat treated at a temperature in a range of 650° C. to 1000° C.

8. The method of claim 1, wherein the additively-manufactured ferromagnetic component is heat treated at a temperature in a range of 700° C. to 900° C.

9. The method of claim 1, wherein a directed energy source is used in the at least one build step for the forming of the additively-manufactured ferromagnetic component and for the heat-treating of the additively-manufactured ferromagnetic component.

10. The method of claim 1, wherein the microstructure of the heat-treated ferromagnetic component has an average grain size of more than 90% of all grains in a range of 1 micron to 20 microns.

11. The method of claim 1, wherein the heat-treated ferromagnetic component has a porosity of less than 0.5 percent.

12. The method of claim 1, wherein the heat-treated ferromagnetic component has a porosity of 0.001 percent to 0.5 percent.

13. The method of claim 1, wherein the heat-treated ferromagnetic component has a porosity of 0.005 percent to 0.1 percent.

14. The method of claim 1, wherein the metal alloy includes iron in a range of 30 atomic percent to 69.9 atomic percent, wherein the metal alloy includes cobalt in a range of 30 atomic percent to 69.9 atomic percent.

15. The method of claim 1, wherein the metal alloy includes an atomic ratio of the amounts of iron and cobalt that is 1:1.

16. The method of claim 1, wherein the heat treating of the as-formed additively-manufactured ferromagnetic component is for a time duration in a range of 1 hour to 10 hours.

17. The method of claim 1, wherein the heat treating of the as-formed additively-manufactured ferromagnetic component is an isothermal heat treatment at a temperature in a range of 700° C. to 850° C.

18. The method of claim 1, wherein the heat treating of the as-formed additively-manufactured ferromagnetic component is for a time duration in a range of 1 hour to 10 hours in an isothermal heat treatment at a temperature in a range of 700° C. to 850° C.

19. The method of claim 1, wherein the heat treating of the as-formed additively-manufactured ferromagnetic component is a cyclic heat treatment, the cyclic heat treatment comprising a first heating of the as-formed additively-manufactured ferromagnetic component to a first temperature for a first duration of time, cooling the as-formed additively-manufactured ferromagnetic component, and a second heating of the as-formed additively-manufactured ferromagnetic component to a second temperature for a second duration of time.

20. The method of claim 1, wherein the heat treating of the as-formed additively-manufactured ferromagnetic component is for a time duration of at least 10 minutes.

\* \* \* \* \*